(12) United States Patent
ElHamahmy

(10) Patent No.: US 12,438,877 B2
(45) Date of Patent: Oct. 7, 2025

(54) INTERMEDIARY DIGITAL RESOURCE ACQUIRER

(71) Applicant: BANK OF AMERICA CORPORATION, Charlotte, NC (US)

(72) Inventor: Hosam Sonny ElHamahmy, Fort Mill, SC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 325 days.

(21) Appl. No.: 17/706,205

(22) Filed: Mar. 28, 2022

(65) Prior Publication Data

US 2023/0308443 A1 Sep. 28, 2023

(51) Int. Cl.
*H04L 9/40* (2022.01)
*G06F 21/64* (2013.01)
*G06F 21/71* (2013.01)
*G06F 21/60* (2013.01)

(52) U.S. Cl.
CPC .............. *H04L 63/10* (2013.01); *H04L 63/08* (2013.01); *H04L 63/20* (2013.01)

(58) Field of Classification Search
None
See application file for complete search history.

(56) References Cited

U.S. PATENT DOCUMENTS

| | | |
|---|---|---|
| 5,794,207 A | 8/1998 | Walker et al. |
| 8,706,618 B2 | 4/2014 | Yu et al. |
| 9,747,586 B1 | 8/2017 | Frolov et al. |
| 10,068,228 B1 * | 9/2018 | Winklevoss ........... G06Q 20/34 |
| 11,139,955 B1 * | 10/2021 | So ...................... G06Q 20/3674 |
| 11,245,525 B2 | 2/2022 | Roongta et al. |
| 11,481,761 B2 | 10/2022 | Lam |
| 11,544,712 B2 * | 1/2023 | Sarkissian ............... G06F 21/33 |
| 11,704,733 B2 | 7/2023 | Wilkins et al. |
| 11,909,860 B1 * | 2/2024 | So .......................... G06Q 40/06 |
| 2002/0087461 A1 | 7/2002 | Ganesan et al. |
| 2011/0196784 A1 | 8/2011 | Newman et al. |

(Continued)

OTHER PUBLICATIONS

A Blockchain-Driven Supply Chain Finance Application for Auto Retail Industry. Chen. MDPI. (Year: 2020).*

(Continued)

*Primary Examiner* — Venkat Perungavoor
(74) *Attorney, Agent, or Firm* — Moore & Van Allen PLLC; Anup Iyer

(57) ABSTRACT

An intermediary digital resource acquirer is provided for resource events that use a digital resource as the means for conducting the resource event. The intermediary digital resource acquirer serves to facilitate the resource event between a resource provider entity, which has presented a digital resource for conducting the resource event, and a resource recipient, which has acquiesced in accepting the digital resource for conducting the resource event. The intermediary digital resource acquirer provides a level of certainty/trust to both the resource-providing entity and the resource-receiving entity. In this regard, the digital resource acquirer provides the resource-providing entity assurance that the resource-receiving entity will perform any obligations required of the resource event and the resource-receiving entity is assured that they will receive resources.

12 Claims, 4 Drawing Sheets

(56) References Cited

U.S. PATENT DOCUMENTS

| | | | |
|---|---|---|---|
| 2015/0220928 A1 | 8/2015 | Allen | |
| 2017/0228704 A1* | 8/2017 | Zhou | G06Q 20/4012 |
| 2018/0240191 A1 | 8/2018 | Aronson | |
| 2018/0268382 A1* | 9/2018 | Wasserman | H04L 9/3247 |
| 2019/0080406 A1 | 3/2019 | Molinari et al. | |
| 2019/0102756 A1* | 4/2019 | Zhou | G06Q 20/3278 |
| 2019/0378140 A1* | 12/2019 | Sarkissian | G06Q 20/02 |
| 2021/0056627 A1* | 2/2021 | Lee | G06Q 20/027 |
| 2021/0174348 A1 | 6/2021 | Leblanc | |
| 2021/0224795 A1 | 7/2021 | Song et al. | |
| 2021/0357915 A1* | 11/2021 | Makrides | G06Q 20/3674 |
| 2022/0052846 A1 | 2/2022 | Diaz Vico et al. | |
| 2022/0084013 A1 | 3/2022 | Kulkarni et al. | |
| 2024/0112157 A1* | 4/2024 | Sun | G06Q 20/36 |

OTHER PUBLICATIONS

Implementation of a Proof of Concept for a Blockchain-based Smart Contract for the Automotive Industry in Mauritius. Luchoomun. IJACSA. (Year: 2020).*

Retail Level Blockchain transformation for product supply chain using truffle development platform. Latif. Springer. (Year: 2020).*

Auditable Protocols for Fair Payment and Physical Asset Delivery Based on Smart Contracts. Wang. IEEE. (Year: 2019).*

Moving Beyond the Crypto-Currency Success of Blockchain: a Systematic Survey. Shahnawaz. (Year: 2021).*

Cryptocurrency as an Alternative Currency in Malaysia: Issues and Challenges. Yussof (Year: 2018).*

Digital trade coin: towards a more stable digital currency. Lipton. (Year: 2018).*

\* cited by examiner

INTERMEDIARY DIGITAL RESOURCE ACQUIRER

FIELD OF THE INVENTION

The present invention is related to resource event processing and, more specifically, providing for an intermediary digital resource acquirer in a resource event in which the resource provider provides a digital resource as the means for conducting resource event.

BACKGROUND

The advent of digital resources as accepted forms of resources has led to a proliferation of different types of digital resources. However, each digital resource comes with a level of uncertainty as to the volatility, availability and maturity of the digital resource itself and/or the type of digital resource.

While digital resources are infrequently used as resources for conducting a resource event, when a digital resource is used it is typically a direct transference of the digital resource from the resource provider to the resource recipient. However, such a direct transference does not provide the resource provider with any recourse in the event that the resource recipient fails to perform their obligations under the resource event (i.e., providing objects, services or the like).

Therefore, a need exists to develop systems, methods and the like for conducting a resource event using digital resources. Such systems, methods and the like, should provide for control over the volatility, availability and maturity of the digital resource being used for conducting the resource event and provide the resource provider with an assurance that the resource recipient will perform their obligations under the resource event.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing for an intermediary digital resource acquirer for resource events that use digital resources as the means for conducting the resource event. The intermediary digital resource acquirer serves to facilitate the resource event between a resource provider entity, which has presented digital resources for conducting the resource event, and a resource recipient, which has acquiesced in accepting digital resources for conducting the resource event.

In specific embodiments of the invention, the intermediary digital resource acquirer, in possession of the digital resource, applies digital resource acceptance rules to determine whether the digital resource is acceptable for conducting the digital event. In accordance with specific embodiments of the invention, the acceptance rules may be associated with the volatility and/or availability of the type of digital resources, the maturity of the digital resources and the like.

In response to applying the rules and determining that the digital resources are acceptable for the resource event, the intermediary digital resource acquirer (i) obligates the resource recipient to perform obligations under the resource event (e.g., transfer one or more objects to the digital resource provider, perform services or the like (ii) initiate transfer of resources in the specified volume to the resource recipient, and (iii) acquire the digital resource by transmitting the digital resource to a distributed trust computing network, at which a plurality of the decentralized nodes are configured to converge on the digital resource to verify an authenticity of the digital resource and, in response to verifying the authenticity, add a data block, which associates the digital resource with the digital resource acquirer, to a distributed ledger on the trust computing network. In specific embodiments of the invention, the digital resource acquirer (i) obligates the resource recipient and/or (ii) initiates transfers of resources to the resource recipient prior to (iii) acquiring the digital resource through distributed trust network verification and entry. In this regard, the resource recipient may be obligated to perform and/or receive resources prior to the digital resource acquirer "acquiring" (i.e., settling) the digital resource.

Thus, in accordance with embodiments of the present invention, the intermediary digital resource acquirer provides a level of certainty/trust to both the resource-providing entity and the resource-receiving entity. In this regard, digital resource acquirer provides the resource-providing entity assurance that the resource-receiving entity will perform any obligations required of the resource event and the resource-receiving entity is assured that they will receive resources.

A system for intermediary digital resource acquisition in a resource event defines first embodiments of the invention. The system includes a distributed trust computing network having a plurality of decentralized nodes. Each decentralized node includes a first memory and one or more first processing devices in communication with the first memory. The first memory of the decentralized nodes is configured to store one or more distributed ledgers. Each distributed ledger including a plurality of data blocks.

The system additionally includes a computing platform in control of a digital resource acquirer and including a second memory and one or more second processing devices in communication with the second memory. The second memory stores digital resource acquirer module that is executable by at least one of the one or more processing devices.

Digital resource acquirer module is configured to receive a digital resource of a specified volume from a digital resource provider in response to (i) the digital resource provider initiating a resource event between a resource recipient and the digital resource provider, and (ii) selecting the digital resource of the specified volume to effectuate the resource event that requires resources in the specified volume. Digital resource acquirer module is further configured to apply one or more digital resource acceptance rules to the digital resource to determine whether the digital resource is acceptable for the digital event. In response to determining that the digital resource is acceptable for the digital event, digital resource acquirer module is further configured to (i) obligate the resource recipient to perform the resource event, (ii) initiate transfer of resources (e.g., digital resources or government-issued resources) in the specified volume to the resource recipient, and (iii) acquire the digital resource by transmitting the digital resource to the distributed trust computing network, which upon receipt, a plurality of the decentralized nodes are configured to converge on the digital resource to verify an authenticity of the digital resource and, in response to verifying the authenticity, add a data block to one of the distributed ledgers that associates the digital resource with the digital resource acquirer.

In specific embodiments of the system, the digital resource acquirer module is further configured to assess a current volatility of the digital resource and apply the one or more digital resource acceptance rules including a digital resource volatility rule that is configured to accept the digital resource for the resource event based on the current volatility of the digital resource being below a digital resource volatility threshold.

In other specific embodiments of the system, the digital resource acquirer module is further configured to determine a maturity of the digital resource and apply the one or more digital resource acceptance rules including a digital resource maturity rule that is configured to accept the digital resource for the resource event based on the maturity of the digital resource being above a digital resource maturity threshold.

In still further specific embodiments of the system, the digital resource acquirer module is further configured to determine an availability of the digital resource and apply the one or more digital resource acceptance rules including a digital resource availability rule that is configured to accept the digital resource for the resource event based on the availability of the digital resource being above a digital resource availability threshold.

In additional specific embodiments of the system, the digital resource acquirer module is further configured to (i) assess a current volatility of the digital resource, (ii) determine an availability of the digital resource, and (iii) determine a maturity of the digital resource, and, in response to (i)-(iii), determine a digital resource acceptance score for the digital resource based at least on the volatility, the availability and the maturity of the digital resource. In such embodiments of the system, the digital resource acquirer module is further configured apply the one or more digital resource acceptance rules including a digital resource acceptance score rule that is configured to accept the digital resource for the resource event based on the digital resource acceptance score being above a digital resource acceptance score threshold.

Moreover, in additional specific embodiments of the system, the digital resource acquirer module is further configured apply the one or more digital resource acceptance rules including a digital resource type rule that is configured to accept the digital resource for the resource event based on a type of the digital resource being one of one or more acceptable digital resource types.

In further specific embodiments of the system, in response to determining that the digital resource is acceptable, the digital resource acquirer module is further configured to (i) obligate the resource recipient to perform the resource event, (ii) initiate transfer of resources in the specified volume to the resource recipient, and, in response to at least one of (i) and (ii), (iii) acquire the digital resource by transmitting the digital resource to the distributed trust computing network, which upon receipt, a plurality of the decentralized nodes are configured to converge on the digital resource to verify an authenticity of the digital resource and, in response to verifying the authenticity, add a data block to one of the distributed ledgers that associates the digital resource with the digital resource acquirer.

In additional specific embodiments of the system, the digital resource acquirer module is further configured to, within a predetermined period of time, (i) obligate the resource recipient to transfer the one or more objects to the digital resource provider, (ii) initiate transfer of resources in the specified volume to the resource recipient, and (iii) acquire the digital resource by transmitting the digital resource to the distributed trust computing.

In still further specific embodiments of the system, the digital resource acquirer module is configured to provide the digital resource provider recourse in response to the resource recipient failing to meet one or more obligations of the resource event.

A computer-implemented method for intermediary digital resource acquisition defines second embodiments of the invention. The computer-implemented method is executed by one or more computing processor devices. The method includes receiving a digital resource of a specified volume from a digital resource provider in response to (i) the digital resource provider initiating a resource event between a resource recipient and the digital resource provider, and (ii) selecting the digital resource of the specified volume to effectuate the resource event that requires resources in the specified volume. The method further includes applying one or more digital resource acceptance rules to the digital resource to determine whether the digital resource is acceptable for the digital event. In response to determining that the digital resource is acceptable for the digital event, the method further includes (i) obligating the resource recipient to perform the resource event, (ii) initiating transfer of resources in the specified volume to the resource recipient, and (iii) acquiring, by a digital resource acquirer, the digital resource by transmitting the digital resource to the distributed trust computing network, in which a plurality of the decentralized nodes are configured to converge on the digital resource to verify an authenticity of the digital resource and, in response to verifying the authenticity, add a data block to one of the distributed ledgers. The data block associates the digital resource with the digital resource acquirer.

In specific embodiments the computer-implemented method further includes assessing a current volatility of the digital resource and, in such embodiments of the method, applying the one or more digital resource acceptance rules further includes applying a digital resource volatility rule that is configured to accept the digital resource for the resource event based on the current volatility of the digital resource being below a digital resource volatility threshold.

In other specific embodiments the computer-implemented method further includes determining at least one of (i) a maturity of the digital resource and (ii) an availability of the digital resource and, in such embodiments of the method, applying the one or more digital resource acceptance rules further includes applying at least one of (a) a digital resource maturity rule that is configured to accept the digital resource for the resource event based on the maturity of the digital resource being above a digital resource maturity threshold and (b) a digital resource availability rule that is configured to accept the digital resource for the resource event based on the availability of the digital resource being above a digital resource availability threshold.

In still further specific embodiments of the computer-implemented method, applying the one or more digital resource acceptance rules further includes applying a digital resource type rule that is configured to accept the digital resource for the resource event based on a type of the digital resource being one of one or more acceptable digital resource types.

In other specific embodiments of the computer-implemented method, the method further includes in response to determining that the digital resource is acceptable for the digital event, (i) obligating the resource recipient to perform the resource event, (ii) initiating transfer of resources in the specified volume to the resource recipient, and, in response to at least one of (i) and (ii), (iii) acquiring the digital resource by transmitting the digital resource to the distributed trust computing network, in which a plurality of the decentralized nodes are configured to converge on the digital resource to verify the authenticity of the digital resource and, in response to verifying the authenticity, add a data block to one of the distributed ledgers. The data block associates the digital resource with the digital resource acquirer.

A computer program product defines third embodiments of the invention. The computer program product includes a non-transitory computer-readable medium having sets of codes for causing one or more computing processing devices to receive a digital resource of a specified volume from a digital resource provider in response to (i) the digital resource provider initiating a resource event between a resource recipient and the digital resource provider, and (ii) selecting the digital resource of the specified volume to effectuate the resource event that requires resources in the specified volume. The sets of codes are further configured to cause the computing processor device(s) to apply one or more digital resource acceptance rules to the digital resource to determine whether the digital resource is acceptable for the digital event. In response to determining that the digital resource is acceptable for the digital event, the sets of codes are further configured to cause the computing processor device(s) to (i) obligate the resource recipient to perform the resource event, (ii) initiate transfer of resources in the specified volume to the resource recipient, and (iii) acquire, by a digital resource acquirer, the digital resource by transmitting the digital resource to the distributed trust computing network, in which a plurality of the decentralized nodes are configured to converge on the digital resource to verify an authenticity of the digital resource and, in response to verifying the authenticity, add a data block to one of the distributed ledgers. The data block associates the digital resource with the digital resource acquirer.

In specific embodiments of the computer program product, the sets of codes are further configured to cause the at least one computing processor device to assess a current volatility of the digital resource. In such embodiments of the computer program product, the set of codes configured to cause the one or more computing processing devices to apply the one or more digital resource acceptance rules is further configured to apply a digital resource volatility rule that is configured to accept the digital resource for the resource event based on the current volatility of the digital resource being below a digital resource volatility threshold.

In additional specific embodiments of the computer program product, the sets of codes are further configured to cause the at least one computing processor device to determine at least one of (i) a maturity of the digital resource, and (ii) an availability of the digital resource. In such embodiments of the computer program product, the set of codes configured to cause the one or more computing processing devices to apply the one or more digital resource acceptance rules is further configured to apply at least one of (a) a digital resource maturity rule that is configured to accept the digital resource for the resource event based on the maturity of the digital resource being above a digital resource maturity threshold, and (b) a digital resource availability rule that is configured to accept the digital resource for the resource event based on the availability of the digital resource being above a digital resource availability threshold.

Moreover, in additional specific embodiments of the computer program product, the set of codes configured to cause the one or more computing processing devices to apply the one or more digital resource acceptance rules is further configured to apply a digital resource type rule that is configured to accept the digital resource for the resource event based on a type of the digital resource being one of one or more acceptable digital resource types.

Thus, according to embodiments of the invention, which will be discussed in greater detail below, the present invention provides for an intermediary digital resource acquirer for resource events that use digital resources as the means for conducting the resource event. The intermediary digital resource acquirer serves to facilitate the resource event between a resource provider entity, which has presented digital resources for conducting the resource event, and a resource recipient, which has acquiesced in accepting digital resources for conducting the resource event. The intermediary digital resource acquirer provides a level of certainty/trust to both the resource-providing entity and the resource-receiving entity. In this regard, the digital resource acquirer provides the resource-providing entity assurance that the resource-receiving entity will perform any obligations required of the resource event and the resource-receiving entity is assured that they will receive resources.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Figure 1:
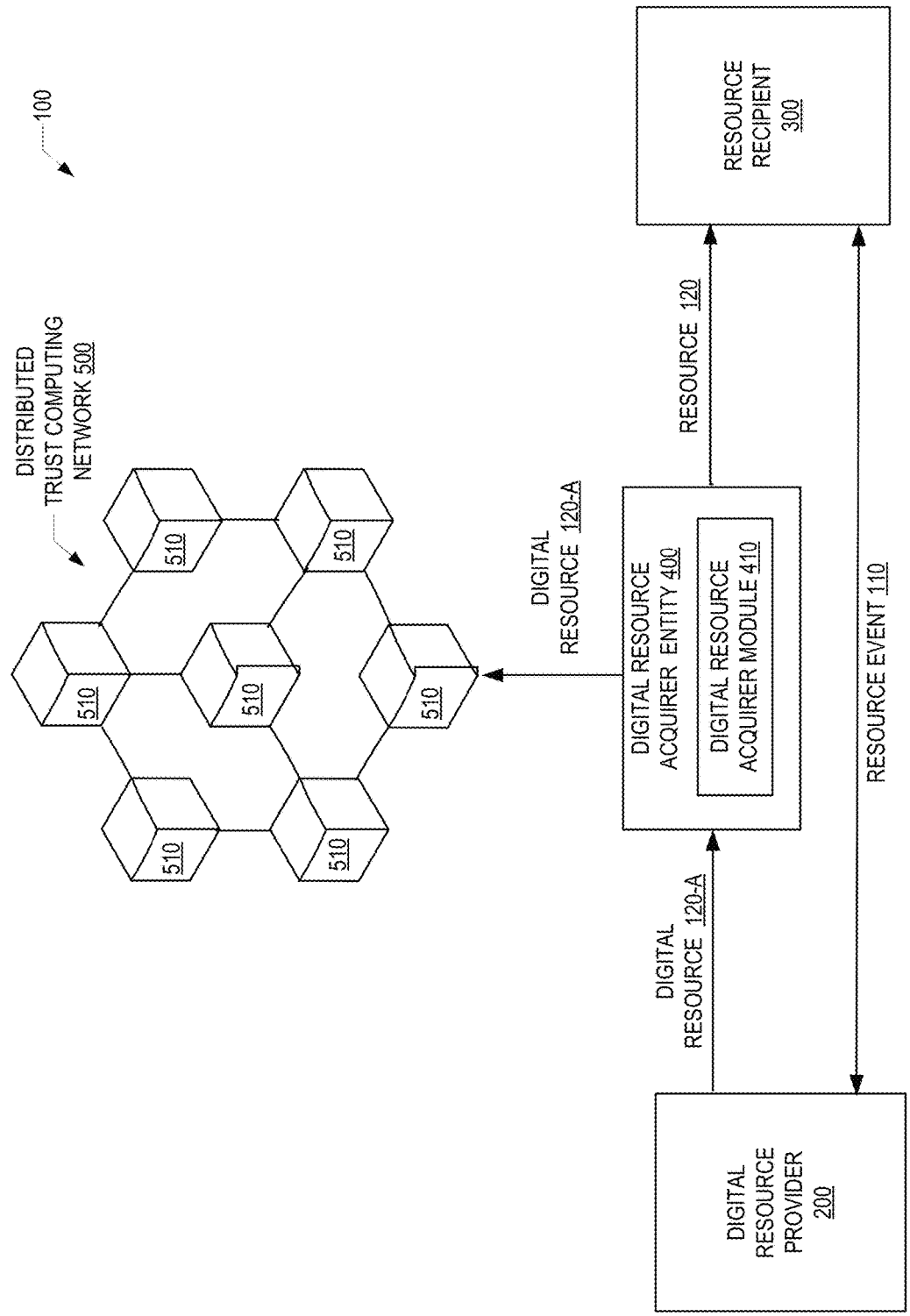
Figure 2:
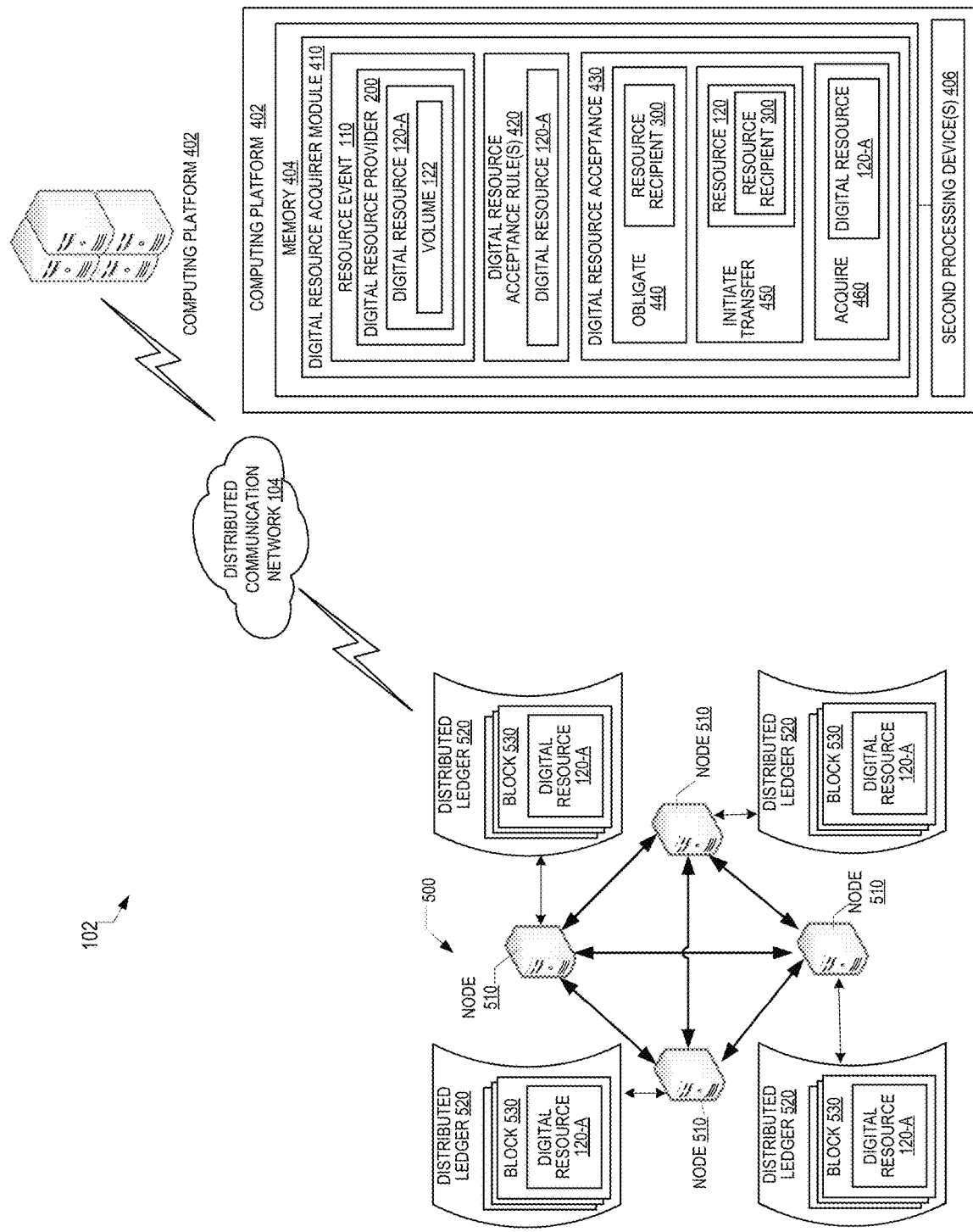
Figure 3:
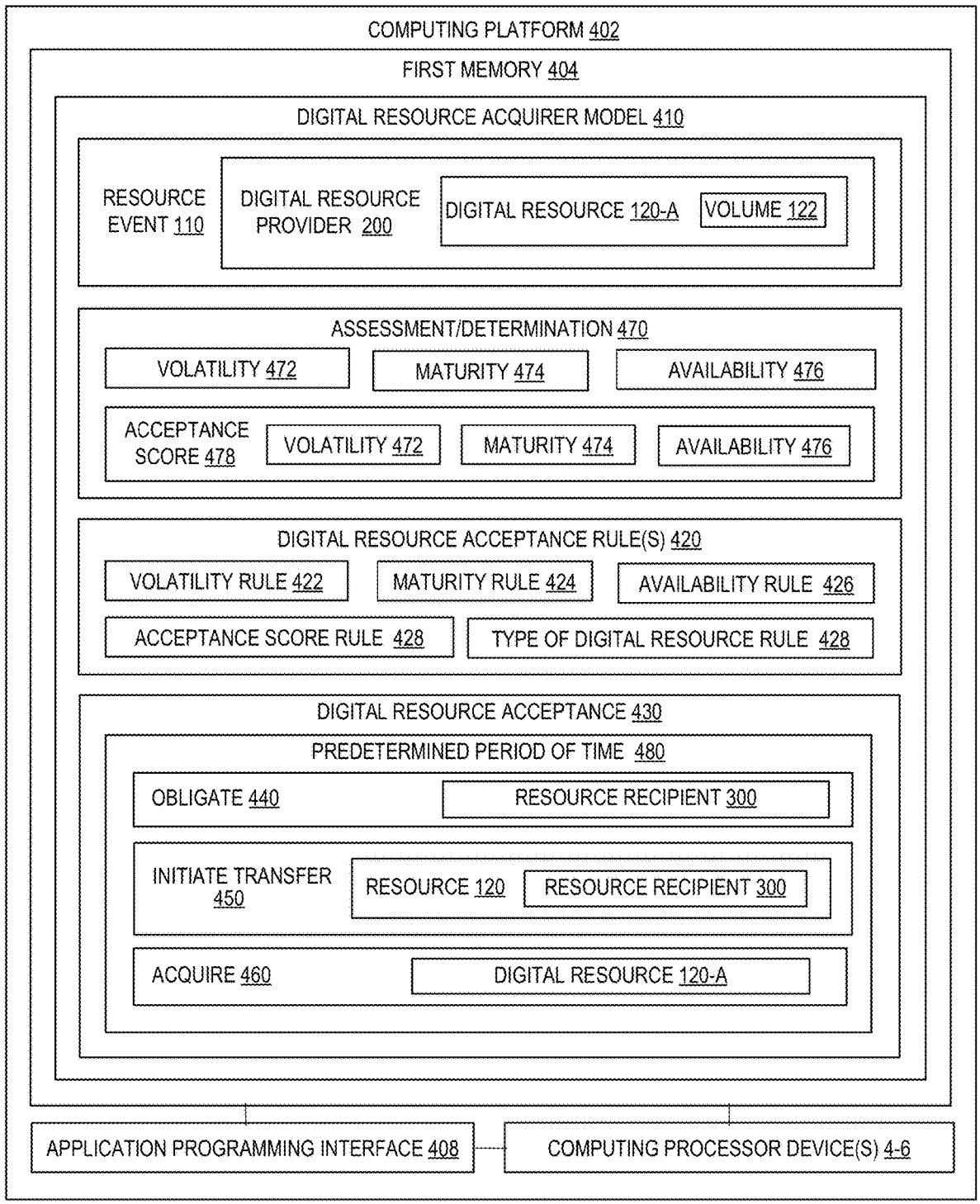
Figure 4:
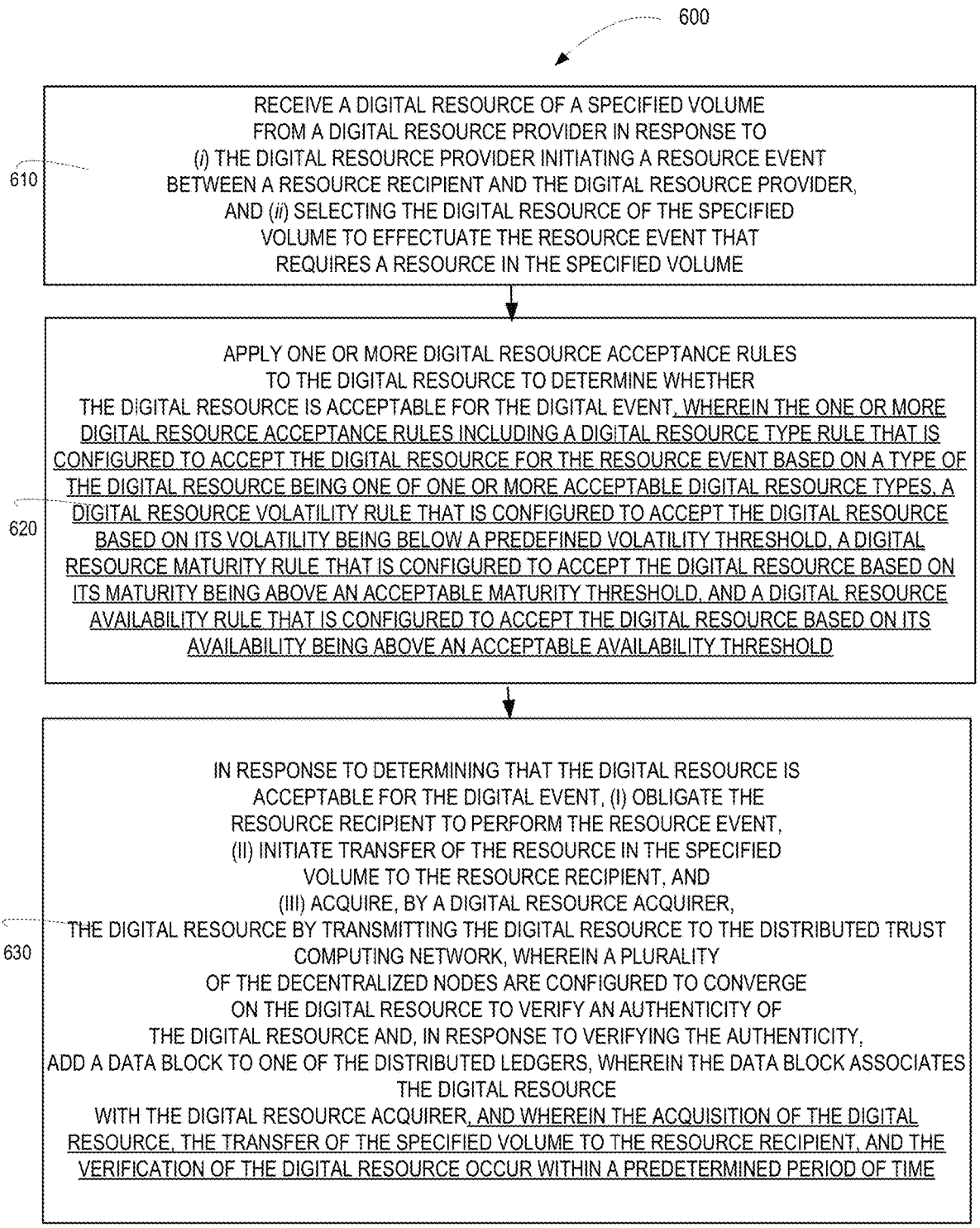

Having thus described embodiments of the disclosure in general terms, reference will now be made to the accompanying drawings, wherein:

FIG. 1 is a high-level block diagram of a system for intermediary digital resource acquisition in a resource event, in accordance with some embodiments of the present disclosure;

FIG. 2 is a schematic/block diagram of a system for intermediary digital resource acquisition in a resource event, in accordance with some embodiments of the present disclosure;

FIG. 3 is a block diagram of a computing platform including a digital resource acquisition module, in accordance with some embodiments of the present disclosure; and FIG. 4 is a flow diagram of a method for intermediary digital resource acquisition in a resource event, in accordance with embodiments of the present invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

As will be appreciated by one of skill in the art in view of this disclosure, the present invention may be embodied as a system, a method, a computer program product or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer-readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as JAVA, PERL, SMALLTALK, C++, PYTHON or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or systems. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions, which implement the function/act specified in the flowchart and/or block diagram block or blocks.

The computer program instructions may also be loaded onto a computer or other programmable data processing apparatus to cause a series of operational events to be performed on the computer or other programmable apparatus to produce a computer implemented process such that the instructions, which execute on the computer or other programmable apparatus, provide events for implementing the functions/acts specified in the flowchart and/or block diagram block or blocks. Alternatively, computer program implemented events or acts may be combined with operator or human implemented events or acts in order to carry out an embodiment of the invention.

As the phrase is used herein, a processor may be "configured to" perform or "configured for" performing a certain function in a variety of ways, including, for example, by having one or more general-purpose circuits perform the function by executing particular computer-executable program code embodied in computer-readable medium, and/or by having one or more application-specific circuits perform the function.

Thus, according to embodiments of the invention, which will be described in more detail below, systems, methods and computer program products are disclosed that providing for an intermediary digital resource acquirer for resource events that use digital resources as the means for conducting the resource event. The intermediary digital resource acquirer serves to facilitate the resource event between a resource provider entity, which has presented digital resources for conducting the resource event, and a resource recipient, which has acquiesced in accepting digital resources for conducting the resource event. In specific embodiments of the invention, in which the digital resource is digital currency, such as cryptocurrency or the like, the intermediary digital resource acquirer is a digital currency acquirer that serves to facilitate a digital currency transaction between a user/buyer that desires to use digital currency in the transaction and a merchant that accepts digital currency.

In specific embodiments of the invention, the intermediary digital resource acquirer, in possession of the digital resource, applies digital resource acceptance rules to determine whether the digital resource is acceptable for conducting the digital event. In accordance with specific embodiments of the invention, the acceptance rules may be associated with the volatility and/or availability of the type of digital resources, the maturity of the digital resources and the like. In specific embodiments of the invention, in which the digital resources are digital currency, the intermediary digital currency acquirer, in possession of the digital currency, applies digital currency acceptance rules to determine whether the digital currency is acceptable for the transaction. Such digital currency acceptance rules may be associated with the volatility and/or availability of the specific type of the digital currency and/or the maturity of the digital currency or other factors that affect the use of the digital currency.

In response to applying the rules and determining that the digital resources are acceptable for the resource event, the intermediary digital resource acquirer (i) obligates the resource recipient to perform obligations under the resource event (e.g., transfer one or more objects to the digital resource provider, perform services or the like (ii) initiate transfer of resources in the specified volume to the resource recipient, and (iii) acquire the digital resource by transmitting the digital resource to a distributed trust computing network, at which a plurality of the decentralized nodes are configured to converge on the digital resource to verify an authenticity of the digital resource and, in response to verifying the authenticity, add a data block, which associates the digital resource with the digital resource acquirer, to a distributed ledger on the trust computing network. In specific embodiments of the invention, the digital resource acquirer (i) obligates the resource recipient and/or (ii) initiates transfers of resources to the resource recipient prior to (iii) acquiring the digital resource through distributed trust network verification and entry. In this regard, the resource recipient may be obligated to perform and/or receive resources prior to the digital resource acquirer "acquiring" (i.e., settling) the digital resource.

In specific embodiments of the invention, in which the digital resource is digital currency, in response to applying the rules and determining that the digital currency is acceptable for the transaction, the intermediary digital currency acquirer (i) obligates the merchant to perform obligations under the transaction (e.g., transfer goods to the buyer, perform services or the like (ii) initiate transfer of funds (e.g., conventional or digital) in the specified transaction amount to the merchant, and (iii) acquire the digital currency by transmitting the digital resource to a distributed trust computing network, at which a plurality of the decentralized nodes are configured to converge on the digital currency to verify an authenticity of the digital currency and, in response to verifying the authenticity, add a data block to a distributed ledger on the trust computing network. The addition of the data block serving to associate (i.e., confirm ownership) of the digital currency by the digital resource acquirer. In further specific embodiments of the invention, the digital currency acquirer (i) obligates the merchant and/or (ii) initiates transfers of funds to the merchant prior to (iii) acquiring the digital currency, in this regard, the merchant may be obligated to perform and/or receive funds prior to the digital currency acquirer "acquiring" the digital currency (i.e., settling the transaction).

Thus, in accordance with embodiments of the present invention, the intermediary digital resource acquirer provides a level of certainty/trust to both the resource-providing entity and the resource-receiving entity. In this regard, digital resource acquirer provides the resource-providing entity assurance that the resource-receiving entity will perform any obligations required of the resource event and the resource-receiving entity is assured that they will receive resources. In specific embodiments of the invention, in which the digital resource is digital currency, digital currency acquirer provides the user/buyer assurance that the merchant will perform any obligations required of the transaction and the merchant is assured that they will receive payment.

Turning now to the figures, FIG. 1 a high-level diagram of a system 100 for intermediary digital resource acquisition in a resource event. A resource event 110 is conducted between a digital resource provider 200 and a resource recipient 300. In specific embodiments of the invention, the resource recipient has, prior to conducting the resource event 110, agreed to accept digital resources and, more specifically, digital resources of a specific type(s), as a form of resources for conducting the resource event 110. In specific embodiments of the system 100 the resource event is a financial transaction, the digital resource provider 200 is a user/customer and the resource recipient 300 is a merchant or some other entity that provides goods or services in exchange for resources the like. In further specific embodiments of the system 100, the digital resource 120-A is any resource that is stored in digital format, for example, a digital currency, such as cryptocurrency, virtual currency, central bank digital currency or the like.

The system 100 employs a digital resource acquirer module 410 operated by a digital resource acquirer entity 400. As part of the resource event 110 in which the digital resource provider 200 provides digital resources 120-A to conduct the resource event 110, the digital resource acquirer module 410 is configured to acquire the digital resource 120-A from the digital resource provider 200 and provide resources 120, either standard/conventional resources or digital resources, to the resource recipient to complete the resource event 110. The digital resource acquirer entity 400 provides a level of certainty/trust to both the digital resource provider 200 and the resource recipient 300. In this regard, the digital resource acquirer entity 400 provides the digital resource provider 200 assurance that the resource recipient 300 will perform any obligations required of the resource event 110 and the resource recipient 300 is assured that they will receive valid resources 120.

In specific embodiments of the system 100, the digital resource acquirer entity 400 is a trusted entity, such as a financial institution or the like. In such embodiments of the system, the financial institution as opposed to the merchant (i.e., resource recipient 300) is the entity that acquires the digital currency (i.e., digital resource 120-A) from the user/customer (i.e., digital resource provider 200) and, as a result of at least initiation of the acquisition process, provides funds/currency, non-digital or digital, to the merchant (i.e., resource recipient 300). The financial institution or other trusted entity provides a level of certainty/trust to both the user/customer (i.e., digital resource provider 200) and the merchant (i.e., resource recipient 300). In this regard, the financial institution or other trusted entity provides the user/customer assurance that the merchant will perform obligations required of the transaction, such as delivery of goods or services and the merchant is assured that they will valid currency.

Digital resource acquirer module 410 is configured to acquire the digital resource 120-A through presentation and validation of the digital resource 120-A at a digital trust computing network 500. The distributed trust computing network 500, in other instances referred to a blockchain network, is a distributed database that maintains, e.g., a list of data records, or the like. In specific embodiments of the invention the data records comprise digital resources, such as digital currency. The security of the data maintained within the trust network is enhanced by the distributed nature of the network. The distributed trust computing network 500 typically includes several decentralized nodes 510, which may be one or more systems, machines, computers, databases, data stores or the like operably connected with one another. In some instances, each of the nodes 510 or multiple nodes 510 are maintained by different entities. A distributed trust computing network 500 typically works without a central repository or single administrator.

A distributed trust computing network 500 provides numerous advantages over traditional storage networks/databases. A large number of the decentralized nodes 510 of a trust network may reach a consensus regarding the validity of resources or data maintained with a block of the distributed trust computing network, in the context of the present invention the validity of the digital resource 120-A.

The distributed trust computing network 500 typically has two primary types of records. The first type is the record type, which consists of the actual data, in this case a digital resource 120-A, stored in a data block 530 (shown in FIG. 2) within a distributed register/ledger 520 (shown in FIG. 2). The second type is the block type, which are records that confirm when and in what sequence certain events became recorded as part of the distributed trust computing network. Records and the events associated therewith are generated by participants using the distributed trust computing network 500 in its normal course of business. A data block(s) 530 is generated by users known as "miners" who use specialized software/equipment to generate data blocks 530. Holders of a data block 530 (e.g., a digital resource 120-A owner/acquirer, such as digital resource acquirer entity 400)

of the distributed trust computing network 500 agree to store the data block 530 within the distributed trust computing network 100 and the related data blocks 530 are passed around to various nodes 510 of the distributed trust computing network 100. A "valid" data block 530 or related event is one that can be validated based on a set of rules that are defined by the particular system implementing the distributed trust computing network 500. For example, in the case of digital resource verification, a valid data block 530 is one that stores a digital resource that is determined to be authentic and in a certifiable state.

Further, a distributed trust computing network 500 is decentralized—meaning that a distributed register/ledger 520 (i.e., a decentralized register/ledger) is maintained on multiple nodes 510 of the distributed trust computing network 500. In this regard, one node 510 in the distributed trust computing network 500 may have a complete or partial copy of the distributed register/ledger 520 or set of records and/or blocks 530 on the distributed trust computing network 500. Transactions/events (e.g., a newly presented digital resource) are initiated at a node 510 of a distributed trust computing network 500 and communicated to various other nodes 510 of the distributed trust computing network 500 for validation purposes. Any of the nodes 510 can validate the content of a data block 530 or an associated event, add the data block 530 and/or the contents of the data block 530 to its copy of the distributed register/ledger 520, and/or broadcast the detail/data of the data block 530, its associated validation (in the form of a data block 530) and/or other data to other nodes 510.

Referring to FIG. 2, a schematic/block diagram is presented of a system 102 for intermediary digital resource acquisition in a resource event, in accordance with embodiments of the present invention. The system 102 is implemented within a distributed communication network 104, which may comprise the Internet, one or more intranets, one or more cellular networks and/or the like. The system 102 includes a distributed trust computing network 500 having a plurality of decentralized nodes 510. Each decentralized node 510 having a memory (not shown in FIG. 2) and one or more processing devices (not shown in FIG. 2) in communication with the memory. The memory of the decentralized nodes 510 is configured to store one or more distributed ledgers 520, each distributed ledger 520 comprising a plurality of data blocks 530.

The system 102 additionally includes a computing platform 402 having a memory 404 and one or more processing devices 406 in communication with memory 404. The memory 404 stores digital resource acquirer module 400 that is executable by at least one of the one or more processing devices 406. The digital resource acquirer module 400 is configured to receive a digital resource 120-A of a specified volume 122 from a digital resource provider 200 in response to (i) the digital resource provider 200 initiating a resource event 110 between a resource recipient 300 (Shown in FIG. 1) and the digital resource provider 200, and (ii) selecting the digital resource 120-A of the specified volume 122 as the form of resources required to effectuate the resource event 110.

In those embodiments of the system 102, in which the digital resources are digital currency, the digital resource acquirer module 400 is configured to receive a digital currency of a specified amount (at least a portion and in some instances all of the required payment amount) from a user/customer (i.e., digital resource provider 200) in response to (i) the user/customer initiating a financial transaction (i.e., resource event 110) between the user/customer and a merchant (i.e., resource recipient 300) or the like, and (ii) selecting the digital currency of the specified amount as the form of payment (i.e., resources) required to effectuate the financial transaction.

In response to receiving the digital resource 120-A, digital resource acquirer module 400 is further configured to apply one or more digital resource acceptance rules 420 to the digital resource 120-A to determine whether the digital resource is acceptable for the digital event 110. As discussed in detail in relation to FIG. 3, infra. the digital resource acceptance rules may be associated with digital resource volatility, digital resource maturity, digital resource availability, digital resource type and the like.

In response to digital resource acceptance 430 (i.e., determining that the digital resource 120-A meets the acceptance rules 420), digital resource acquirer module 400 is further configured to (i) obligate 440 the resource recipient 300 to perform obligations under the resource event 110, (ii) initiate transfer 450 of the resource 120 required of the resource event 110 to the resource recipient 300, and (iii) acquire 460 the digital resource 120-A by transmitting the digital resource 120-A to the distributed trust computing network 500. Transmission of the digital resource 120-A to the distributed trust computing network 500 provides for a plurality of the decentralized nodes 500 to converge on the digital resource 120-A to verify an authenticity of the digital resource 120-A and, in response to verifying the authenticity, add a data block 530 to one of the distributed ledgers 520 that associates (i.e., denotes acquisition) the digital resource 120-0 with the digital resource acquirer 400 (shown in FIG. 1).

In those embodiments of the system 102, in which the digital resources are digital currency, in response to digital currency acceptance, digital resource acquirer module 400 is further configured to (i) obligate 440 the merchant to perform obligations under the financial transaction (i.e., deliver the goods or services), (ii) initiate transfer 450 of the funds in the amount required of the transaction to the merchant, and (iii) acquire 460 the digital currency by transmitting the digital currency to the distributed trust computing network 500.

Referring to FIG. 3, a block diagram is presented of computing platform 402 including digital resource acquirer module 410, in accordance with embodiments of the present invention. In addition to providing greater details, FIG. 3 highlights various alternate embodiments of the invention. Computing platform 402, which may comprise more than one computing devices, such as application servers or the like, includes memory 404, which may comprise volatile and non-volatile memory, such as read-only and/or random-access memory (RAM and ROM), EPROM, EEPROM, flash cards, or any memory common to computing platforms). Moreover, memory 404 may comprise cloud storage, such as provided by a cloud storage service and/or a cloud connection service.

Further, computing platform 402 also includes at least one processing device 406, which may be an application-specific integrated circuit ("ASIC"), or other chipset, logic circuit, or other data processing device. Processing device(s) 406 may execute one or more application programming interface (APIs) 408 that interface with any resident programs, such as digital resource acquirer module 410 or the like, stored in memory 404 of computing platform 402 and any external programs. Processing devices(s) 406 may include various processing subsystems (not shown in FIG. 3) embodied in hardware, firmware, software, and combinations thereof, that enable the functionality of computing platform 402 and the operability of computing platform 400 on the distributed communication network 104 (shown in FIG. 2). For example, processing subsystems allow for initiating and maintaining communications and exchanging data with other networked devices. For the disclosed aspects, processing subsystems of processing device(s) 406 may include any subsystem used in conjunction with digital resource acquirer module 410 and related tools, routines, sub-routines, algorithms, sub-algorithms, sub-modules thereof.

Computing platform 402 may additionally include a communications module (not shown in FIG. 3) embodied in hardware, firmware, software, and combinations thereof, that enables electronic communications between the computing platform 402 and other networks and network devices, such as distributed trust computing network 500 shown in FIGS. 1 and 2. Thus, the communication module may include the requisite hardware, firmware, software and/or combinations thereof for establishing and maintaining a network communication connection with one or more devices and/or networks.

Memory 404 of computing platform 402 stores digital resource acquirer module 410 that is executable by at least one of computing processor device(s) 406. Digital resource acquirer module 410 is configured to receive a digital resource 120-A of a specified volume 122 from a digital resource provider 200 in response to (i) the digital resource provider 200 initiating a resource event 110 between a resource recipient 300 (shown in FIG. 1) and the digital resource provider 200, and (ii) selecting the digital resource 120-A of the specified volume 122 as the form of resources 120 required to effectuate the resource event 110. As previously discussed, in specific embodiments of the invention, in which the digital resource is digital currency, the digital resource acquirer module 400 is configured to receive a digital currency of a specified amount (at least a portion and in some instances all of the required payment amount) from a user/customer in response to (i) the user/customer initiating a financial transaction between the user/customer and a merchant or the like, and (ii) selecting the digital currency of the specified amount as the form of payment for at least a portion of the required payment amount for the transaction.

In specific embodiments of the invention, digital resource acquirer module 410 or some ancillary module/application is configured to perform an assessment/determination 470 of one or more of (i) digital resource volatility 472, (ii) digital resource maturity 474 and/or (iii) digital resource availability 476. Digital resource volatility 472 is an assessment of the current volatility (i.e., fluctuation in value in relation to time) of the digital resource. Digital resource maturity 474 is a determination of the period of time that the digital resource has been in use. Digital resource availability 476 is a determination of the current availability of the type of digital resource. In addition, an overall digital resource acceptance score 478 may be determined based on one or more of (i) digital resource volatility 472, (ii) digital resource maturity 474 and/or (iii) digital resource availability 476.

In response to receiving the digital resource 120-A and, in some embodiments making requisite assessments/determinations 470, digital resource acquirer module 400 is further configured to apply one or more digital resource acceptance rules 420 to the digital resource 120-A to determine whether the digital resource is acceptable for the digital event 110. The digital resource acceptance rules may include, but are not limited to, (i) volatility rule 422, (ii) maturity rule 424, (iii) availability rule 426, (iv) acceptance score rule 428, and (v) type of digital resource rule 429. Volatility rule 422 is configured to determine whether the volatility of the digital resource is below an acceptable volatility threshold. Maturity rule 424 is configured to determine whether the maturity of the digital resource is above an acceptable maturity threshold. Availability rule 422 is configured to determine whether the availability of the digital resource is above an acceptable availability threshold. Acceptance score rule 428 is configured to determine whether the acceptance score for the digital resource is above an acceptable acceptance score threshold. Type of digital resource rule 429 is configured to determine whether the type of digital resource is currently acceptable. It should be noted that acceptable digital resource type may be determined based on what types of digital resources are presented to the digital resource provider 200 as acceptable forms of resources 120 for conducting the resource event 110 (i.e., what types of digital resources the digital resource provider can select from amongst) thus, obviating the need for a type of digital resource rule 429 to be implemented at the digital resource acquirer module 410 level.

In response to digital resource acceptance 430, digital resource acquirer module 400 is further configured to (i) obligate 440 the resource recipient 300 to perform obligations under the resource event 110, (ii) initiate transfer 450 of the resource 120 required of the resource event 110 to the resource recipient 300, and (iii) acquire 460 the digital resource 120-A by transmitting the digital resource 120-A to the distributed trust computing network 500. Transmission of the digital resource 120-A to the distributed trust computing network 500 provides for a plurality of the decentralized nodes to converge on the digital resource 120-A to verify an authenticity of the digital resource 120-A and, in response to verifying the authenticity, add a data block 530 to one of the distributed ledgers 520 that associates (i.e., denotes acquisition) the digital resource 120-0 with the digital resource acquirer 400 (shown in FIG. 1).

In specific embodiments of the invention, at least one and, in some embodiments, all of obligating 440 performance, initiating transfer 450 of resources 120 and acquisition 460 of the digital resources must occur within a predetermined time period 480 so as to assure that the resource event is completed within allowable time limits and to limit the volatility factor of the digital resource. In additional specific embodiments of the invention, at least one of obligating 440 performance, initiating transfer 450 of resources 120 is configured to occur prior to, acquisition 460 of the digital resources. In this regard, the resource event may be completed/settled prior to the digital resource being acquired by the intermediary digital resource acquirer.

As previously discussed, in those embodiments of the invention, in which the digital resources are digital currency, in response to digital currency acceptance, digital resource acquirer module 400 is further configured to (i) obligate 440 the merchant to perform obligations under the financial transaction (i.e., deliver the goods or services), (ii) initiate transfer 450 of the funds in the amount required of the transaction to the merchant, and (iii) acquire 460 the digital currency by transmitting the digital currency to the distributed trust computing network 500. In specific embodiment of the invention one or more of (i) obligating 440 the merchant to perform obligations under the financial transaction (i.e., deliver the goods or services), and (ii), and (iii) acquiring 460 the digital currency by transmitting the digital currency to the distributed trust computing network 500 may be required to be completed within a predetermined period of time 480. Moreover, in other embodiments of the invention, at least one of obligating 440 the merchant to perform obligations under the financial transaction and initiating transfer 450 of the funds in the amount required of the transaction to the merchant is configured to occur prior to, acquisition 460 the digital currency by the trusted entity (e.g., financial institution).

Referring to FIG. 4, a flow diagram is presented of a method 600 for intermediary acquisition of a digital resource in a resource event, in accordance with embodiments of the present invention. At Event 610, a digital resource of a specified volume is received from a digital resource provider. The digital resource is received in response to (i) the digital resource provider initiating a resource event between a resource recipient and the digital resource provider, and (ii) selecting the digital resource as the form of resources for the resources required to effectuate the resource event.

At Event 620, one or more digital resource acceptance rules are applied to determine whether the digital resource is acceptable for the digital event. As previously discussed, the acceptance rules may include, but are not limited to, a digital resource volatility rule, a digital resource maturity rule, a digital resource availability rule, a digital resource acceptance score rule that takes into account one or more of volatility, maturity and availability and a digital resource type rule.

In response to determining that the digital resource is acceptable, at Event 630, the method further includes (i) obligating the resource recipient to perform obligations under the resource event, (ii) initiating transfer of the resource required of the resource event to the resource recipient, and (iii) acquiring the digital resource by transmitting the digital resource to the distributed trust computing network. Transmission of the digital resource to the distributed trust computing network provides for a plurality of the decentralized nodes to converge on the digital resource to verify an authenticity of the digital resource and, in response to verifying the authenticity, add a data block to one of the distributed ledgers that associates (i.e., denotes acquisition) the digital resource with the digital resource acquirer.

Thus, present embodiments of the invention provide for an intermediary digital resource acquirer for resource events that use digital resources as the means for conducting the resource event. The intermediary digital resource acquirer serves to facilitate the resource event between a resource provider entity, which has presented digital resources for conducting the resource event, and a resource recipient, which has acquiesced in accepting digital resources for conducting the resource event. The intermediary digital resource acquirer provides a level of certainty/trust to both the resource-providing entity and the resource-receiving entity. In this regard, the digital resource acquirer provides the resource-providing entity assurance that the resource-receiving entity will perform any obligations required of the resource event and the resource-receiving entity is assured that they will receive resources.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein

What is claimed is:

1. A system for intermediary digital resource acquisition in a resource event, the system comprising:
  a distributed trust computing network comprising a plurality of decentralized nodes, each decentralized node having a first memory and one or more first processing devices in communication with the first memory, wherein the first memory of the decentralized nodes is configured to store one or more distributed ledgers, each distributed ledger comprising a plurality of data blocks; and
  a computing platform in control of a digital resource acquirer and including a second memory and one or more second processing devices in communication with the second memory, wherein the second memory stores a set of computer readable instructions that are executable by at least one of the one or more processing devices and configured to:
    receive a digital resource of a specified volume from a digital resource provider, wherein the digital resource is a digital currency and is received in response to (i) the digital resource provider initiating a resource event between a resource recipient and the digital resource provider, and (ii) selecting the digital resource of the specified volume to effectuate the resource event that requires a resource in the specified volume,
    apply one or more digital resource acceptance rules to the digital resource to determine whether the digital resource is acceptable for the digital event, wherein the one or more digital resource acceptance rules including a digital resource type rule that is configured to accept the digital resource for the resource event based on a type of the digital resource being one of one or more acceptable digital resource types, a digital resource volatility rule that is configured to accept the digital resource based on its volatility being below a predefined volatility threshold, a digital resource maturity rule that is configured to accept the digital resource based on its maturity being above an acceptable maturity threshold, and a digital resource availability rule that is configured to accept the digital resource based on its availability being above an acceptable availability threshold, and
    in response to determining that the digital resource is acceptable for the digital event, (i) obligate the resource recipient to perform the resource event, and (ii) initiate transfer of the resource in the specified volume to the resource recipient, and
    in response to transferring the resource in the specified volume to the resource recipient, acquire the digital resource by transmitting the digital resource to the distributed trust computing network, wherein a plurality of the decentralized nodes are configured to converge on the digital resource to verify an authenticity of the digital resource and, in response to verifying the authenticity, add a data block to one of the distributed ledgers, wherein the data block associates the digital resource with the digital resource acquirer, and wherein the acquisition of the digital resource, the transfer of the specified volume to the resource recipient, and the verification of the digital resource occur within a predetermined period of time to reduce impact of digital resource volatility on settlement.

2. The system of claim 1, wherein the set of computer readable instructions are further configured to determine a maturity of the digital resource and apply the one or more digital resource acceptance rules including a digital resource maturity rule that is configured to accept the digital resource for the resource event based on the maturity of the digital resource being above a digital resource maturity threshold.

3. The system of claim 1, wherein the set of computer readable instructions are further configured to determine an availability of the digital resource and apply the one or more digital resource acceptance rules including a digital resource availability rule that is configured to accept the digital resource for the resource event based on the availability of the digital resource being above a digital resource availability threshold.

4. The system of claim 1, wherein the set of computer readable instructions are further configured to:
   determine an availability of the digital resource,
   determine a maturity of the digital resource, and
   determine a digital resource acceptance score for the digital resource based at least on the availability and the maturity of the digital resource.

5. The system of claim 4, wherein the set of computer readable instructions are further configured to apply the one or more digital resource acceptance rules including a digital resource acceptance score rule that is configured to accept the digital resource for the resource event based on the digital resource acceptance score being above a digital resource acceptance score threshold.

6. The system of claim 1, wherein the set of computer readable instructions are further configured to:
   in response to determining that the digital resource is acceptable for the digital event, (ii) initiate transfer of the resource in the specified volume to the resource recipient, wherein a type of the resource is configured to be selected by the resource recipient, wherein the type includes a digital resource and a government-issued resource.

7. The system of claim 1, wherein the set of computer readable instructions are further configured to, within a predetermined period of time, (i) obligate the resource recipient to perform the resource event, (ii) initiate transfer of the resource in the specified volume to the resource recipient, and (iii) acquire the digital resource by transmitting the digital resource to the distributed trust computing.

8. The system of claim 1, wherein set of computer readable instructions are configured to provide the digital resource provider recourse in response to the resource recipient failing to meet one or more obligations of the resource event.

9. A computer-implemented method for intermediary digital resource acquisition, the computer-implemented method is executed by one or more computing processor devices and comprising:
   receiving a digital resource of a specified volume from a digital resource provider, wherein the digital resource is a digital currency and is received in response to (i) the digital resource provider initiating a resource event between a resource recipient and the digital resource provider, and (ii) selecting the digital resource of the specified volume to effectuate the resource event that requires a resource in the specified volume;
   applying one or more digital resource acceptance rules to the digital resource to determine whether the digital resource is acceptable for the digital event, wherein the one or more digital resource acceptance rules including a digital resource type rule that is configured to accept the digital resource for the resource event based on a type of the digital resource being one of one or more acceptable digital resource types, a digital resource volatility rule that is configured to accept the digital resource based on its volatility being below a predefined volatility threshold, a digital resource maturity rule that is configured to accept the digital resource based on its maturity being above an acceptable maturity threshold, and a digital resource availability rule that is configured to accept the digital resource based on its availability being above an acceptable availability threshold; and
   in response to determining that the digital resource is acceptable for the digital event, (i) obligating the resource recipient to perform the resource event, and (ii) initiating transfer of the resource in the specified volume to the resource recipient; and
   in response to transferring the resource in the specified volume to the resource recipient, acquiring, by a digital resource acquirer, the digital resource by transmitting the digital resource to the distributed trust computing network, wherein a plurality of the decentralized nodes are configured to converge on the digital resource to verify an authenticity of the digital resource and, in response to verifying the authenticity, add a data block to one of the distributed ledgers, wherein the data block associates the digital resource with the digital resource acquirer, and wherein the acquisition of the digital resource, the transfer of the specified volume to the resource recipient, and the verification of the digital resource occur within a predetermined period of time to reduce impact of digital resource volatility on settlement.

10. The computer-implemented method of claim 9, further comprising determining at least one of (i) a maturity of the digital resource and (ii) an availability of the digital resource and wherein applying the one or more digital resource acceptance rules further comprises applying at least one of (a) a digital resource maturity rule that is configured to accept the digital resource for the resource event based on the maturity of the digital resource being above a digital resource maturity threshold and (b) a digital resource availability rule that is configured to accept the digital resource for the resource event based on the availability of the digital resource being above a digital resource availability threshold.

11. A computer program product comprising:
   a non-transitory computer-readable medium comprising sets of codes for causing one or more computing processing devices to:
   receive a digital resource of a specified volume from a digital resource provider, wherein the digital resource is a digital currency and is received in response to (i) the digital resource provider initiating a resource event between a resource recipient and the digital resource provider, and (ii) selecting the digital resource of the specified volume to effectuate the resource event that requires a resource in the specified volume;
   apply one or more digital resource acceptance rules to the digital resource to determine whether the digital resource is acceptable for the digital event, wherein the one or more digital resource acceptance rules including a digital resource type rule that is configured to accept the digital resource for the resource event based on a type of the digital resource being one of one or more acceptable digital resource types, a digital resource volatility rule that is configured to accept the digital resource based on its volatility being below a predefined volatility threshold, a digital resource maturity rule that is configured to accept the digital resource based on its maturity being above an acceptable maturity threshold, and a digital resource availability rule that is configured to accept the digital resource based on its availability being above an acceptable availability threshold; and in response to determining that the digital resource is acceptable for the digital event, (i) obligate the resource recipient to perform the resource event, and (ii) initiate transfer of the resource in the specified volume to the resource recipient; and in response to transferring the resource in the specified volume to the resource recipient, acquire, for a digital resource acquirer, the digital resource by transmitting the digital resource to the distributed trust computing network, wherein a plurality of the decentralized nodes are configured to converge on the digital resource to verify an authenticity of the digital resource and, in response to verifying the authenticity, add a data block to one of the distributed ledgers, wherein the data block associates the digital resource with the digital resource acquirer, and wherein the acquisition of the digital resource, the transfer of the specified volume to the resource recipient, and the verification of the digital resource occur within a predetermined period of time to reduce impact of digital resource volatility on settlement.

12. The computer program product of claim 11, wherein the sets of codes are further configured to cause the at least one computing processor device to determine at least one of (i) a maturity of the digital resource and (ii) an availability of the digital resource, and wherein the set of codes configured to cause the one or more computing processing devices to apply the one or more digital resource acceptance rules is further configured to apply at least one of (a) a digital resource maturity rule that is configured to accept the digital resource for the resource event based on the maturity of the digital resource being above a digital resource maturity threshold and (b) a digital resource availability rule that is configured to accept the digital resource for the resource event based on the availability of the digital resource being above a digital resource availability threshold.

* * * * *